United States Patent [19]

McBride

[11] Patent Number: 5,777,731
[45] Date of Patent: Jul. 7, 1998

[54] CALIBRATION OF OPTICAL PROPERTIES TO MEASURE DEPTH OF A LIQUID

[75] Inventor: Donald Dean McBride, Albuquerque, N. Mex.

[73] Assignee: The Goodyear Tire & Rubber Company, Akron, Ohio

[21] Appl. No.: 804,721

[22] Filed: Feb. 21, 1997

[51] Int. Cl.⁶ .................................................. G01B 11/00
[52] U.S. Cl. ........................................... 356/243; 356/371
[58] Field of Search .................................... 356/371, 243

[56] References Cited

U.S. PATENT DOCUMENTS 4,650,327  3/1987  Ogi ............................................ 356/243
5,289,267  2/1994  Busch et al. ............................. 356/371
5,440,386  8/1995  Campas .................................... 356/243
5,552,884  9/1996  Li et al. .................................... 356/243

*Primary Examiner*—Richard A. Rosenberger
*Attorney, Agent, or Firm*—David E Wheeler

[57] ABSTRACT

A calibration device, which makes it possible to correlate optical properties of a liquid at specific depths, can be used to establish an optical property/depth correlation so that optical properties can be used to establish depth of various parts of a test object. In the illustrated embodiment, the calibration device is used to help measure hydroplaning in tires.

5 Claims, 5 Drawing Sheets

CALIBRATION OF OPTICAL PROPERTIES TO MEASURE DEPTH OF A LIQUID

BACKGROUND OF THE INVENTION

The present invention relates to an apparatus and method for optically calibrating liquid depth in a test apparatus using a liquid to make measurements.

For some applications, it is desirable to measure differences in depth between various parts of an object and a surface with which the object makes contact. For example, in testing for hydroplaning in tires, a tire is passed at various speeds over a glass plate covered with a specific depth of water, and photographs are taken of the tire as it passes over the glass plate. Hydroplaning of various tire designs can be compared with each other by comparing the amount of contact between the tread pattern and the glass plate.

There is no method in the prior art, however, to measure to what height a portion of the tread pattern is lifted above the glass plate when hydroplaning, or to measure the height to which specific lugs are lifted above the glass plate when passing through a liquid medium covering the glass plate.

SUMMARY OF THE INVENTION

A calibration fixture for optical measurement of liquid depth comprises a base consisting of a flat contact surface around the perimeter of a first side of the base and a recessed area within the perimeter. Calibration markers of various height are within the recessed area and at least one calibration marker is spring loaded such that when placed on a flat surface the spring loaded calibration marker will have the same height as the contact surface around the perimeter.

In a method of the invention for calibrating optical measurements of liquid depth in a testing apparatus, the steps comprise, (a) providing a test apparatus with a glass plate for containing a liquid and maintaining liquid depth at a constant level throughout test procedures using the liquid, (b) optionally adding agents of a type and concentration to the liquid which give the liquid some level of opacity without making the liquid totally opaque, (c) placing the calibration fixture of the invention in the liquid, and (d) photographing the calibration fixture through the glass bottom of the test apparatus and (e) correlating optical properties around calibration markers with depth. In more specific embodiments of the invention, the method comprises the further steps of (a) passing a test object on which measurements are to be taken through the liquid in the test apparatus, (b) observing the test object through the glass plate in the test apparatus, and (c) correlating optical properties of the liquid around the test object in a photograph with optical properties of the liquid around the calibration fixture to determine the depth of the liquid around the test object.

DETAILED DESCRIPTION OF THE INVENTION

Figure 1:
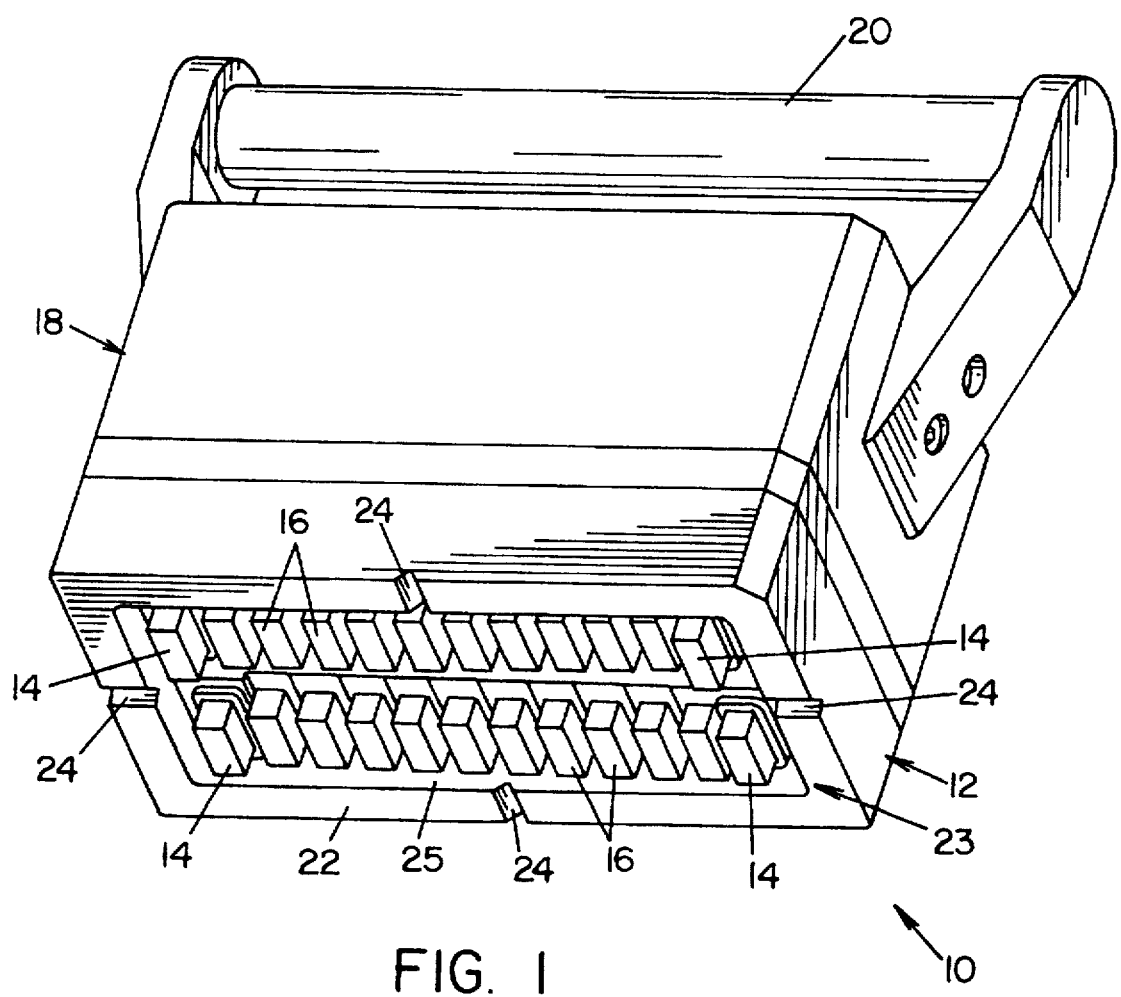
FIG. 1 illustrates a perspective view of a liquid depth calibration device of the invention.
Figure 2:
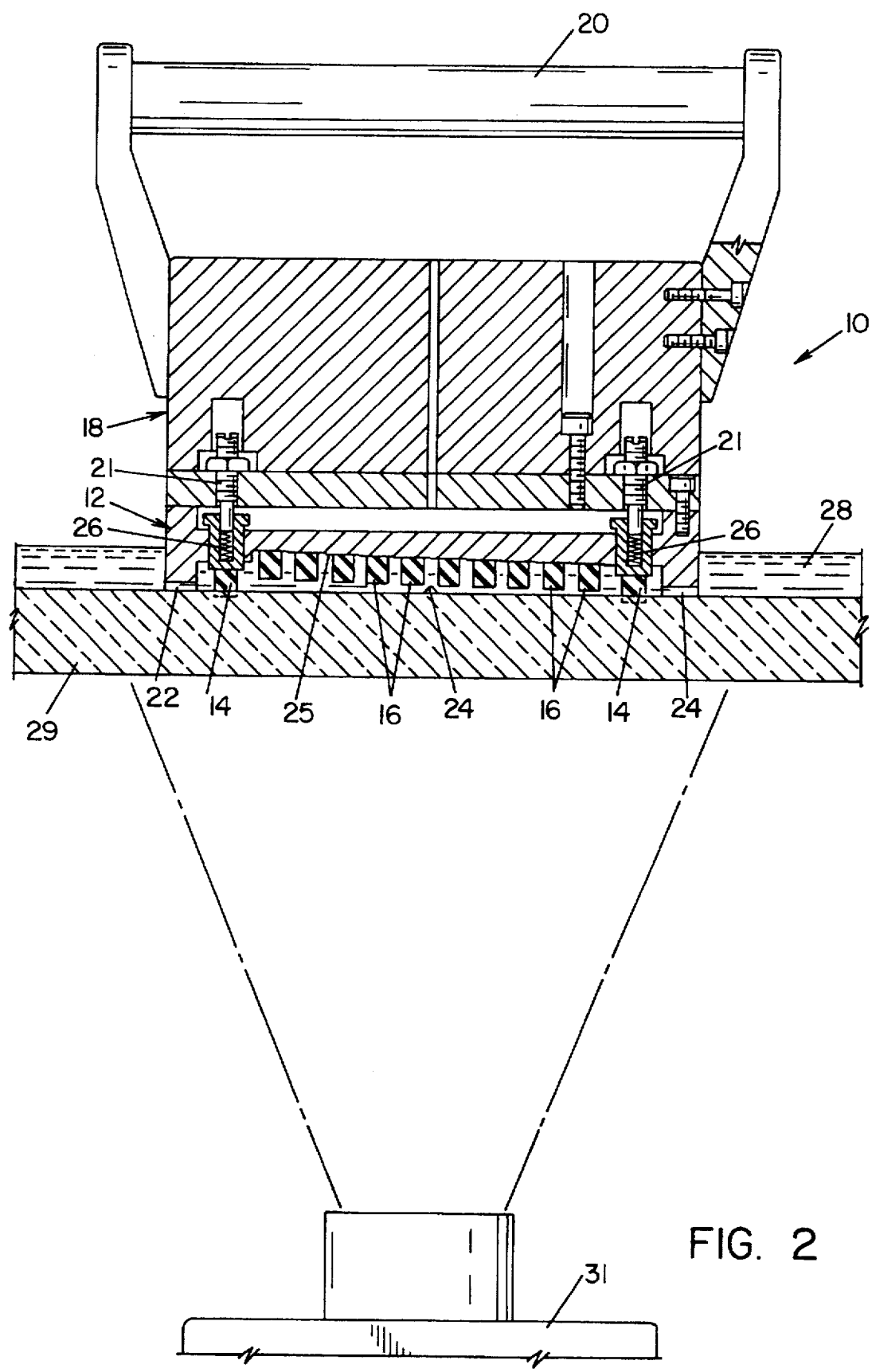
FIG. 2 illustrates a cut away side view of the calibration device of the invention.

With reference now to FIG. 1, in an illustrated embodiment, a calibration device 10 of the invention comprises a base portion 12 which has a flat contact surface 22 around its perimeter 23 for contact with the glass plate of a tire hydroplaning test apparatus. Such tire test apparatus are well known to those skilled in the art. Within perimeter 23 is recessed area 25 in which are disposed a number of calibration pads 16. In the illustrated embodiment, the calibration pads 16 are made of tread rubber so a calibration is made with the same type of materials that will be optically observed on the test object tire. As can best be seen in FIG. 2, calibration pads 16 each have different heights as compared to each other and as compared to the flat contact surface 22 of perimeter 23. At least one spring loaded calibration pad 14 is incorporated in recessed area 25 to insure that at least one calibration pad is in contact with the glass plate 29. Camera 31 may be optionally used to photograph the calibration fixture and a test object and to compare the contrast between them in photographs to obtain a measurement.

Figure 3:
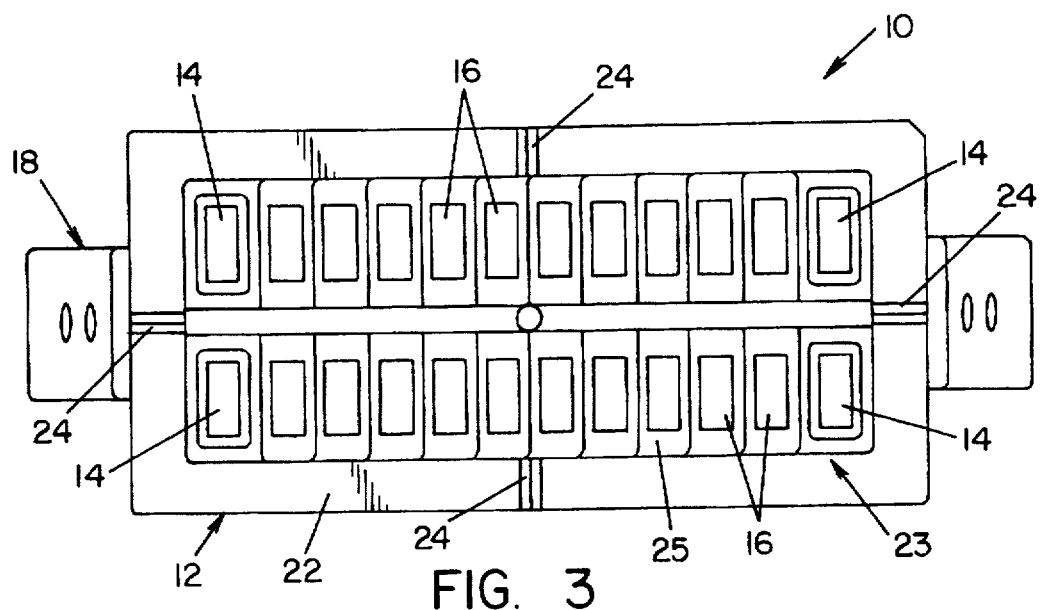
FIG. 3 illustrates a view of the contact surface of the calibration device of the invention.
Figure 4:
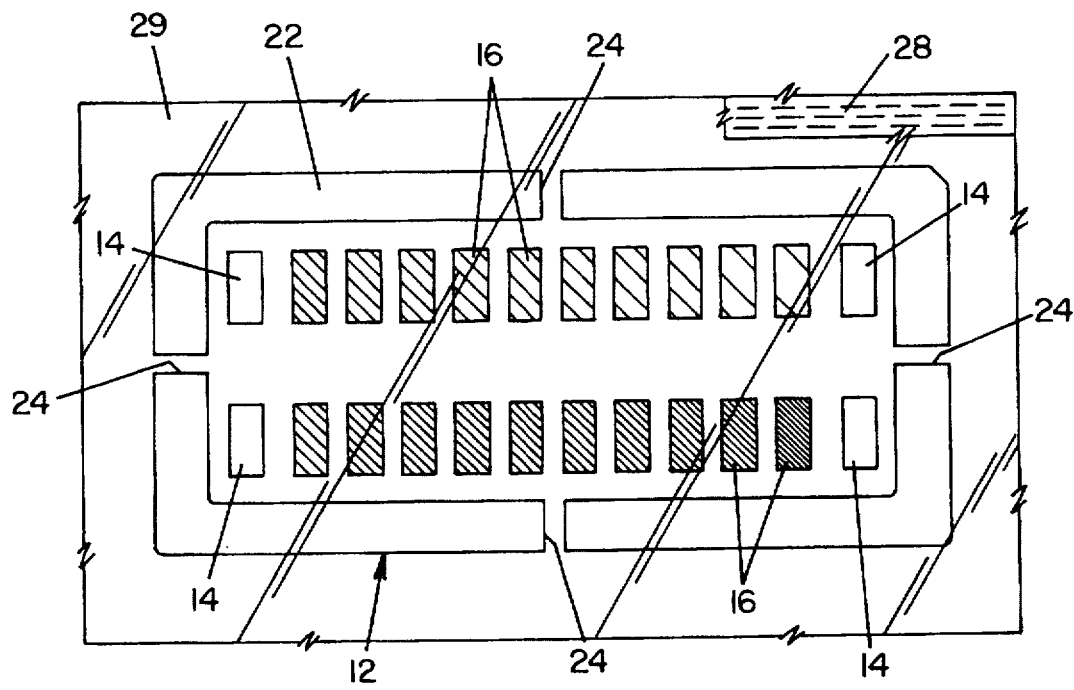
FIG. 4 illustrates the calibration device of the invention immersed in liquid on the glass plate.

In the illustrated embodiment, calibration device 10 has a handle assembly 18 with a handle 20, handle 20 being used to make easier placement and removal of calibration device 10 from the glass plate. Handle assembly 18 also contains the bolts 21 used to hold spring 26 which applies a force against spring loaded calibration fixture 14. In the illustrated embodiment, as can be seen in FIGS. 3 and 4, calibration fixtures at the four corners of the device are spring loaded.

Those skilled in the art will recognize that the calibration device can employ any number of spring loaded calibration fixtures 14, at least one being desirable, and that the device can be any suitable geometric shape, including round, square, rectangular, pentagonal, etc.

Each spring loaded calibration fixture may have a different known spring pressure, and it has been discovered that different pressures cause the spring loaded calibration fixtures to exhibit different opacities on the glass plate. It has been found that the different opacities have a correlation with the amount of pressure applied, and a comparison of the opacity of a spring loaded fixture with the opacity of a tire lug can be used to estimate the pressure that a particular tire lug exhibits in the footprint of a tire on the glass plate.

In order to permit liquid 28 to reach its own level easily within recessed area 25 of the device, at least one notch 24 is provided in perimeter 23 to permit liquid 28 to flow into and out of recessed area 25.

With reference to FIG. 4, when the calibration device 10 is placed on a glass plate covered with liquid 28, and the liquid is observed through the glass plate, the optical density of liquid 28 depends on the depth of liquid 28, which depth is known for each calibration pad 16, and when optical density is correlated to depth, measurements of depth on the test object can be made by measuring optical density of the liquid at specific portions of the test object.

In the illustrated embodiment, liquid 28 is water containing a substance, i.e. a dye, which modifies the opacity of the water. Those skilled in the art will recognize that other liquids can be used in the apparatus of the invention that have a natural color and therefore a natural opacity, the only requirements for use in the invention being that the liquid have color and is not opaque at the depths of interest.

Figure 5:
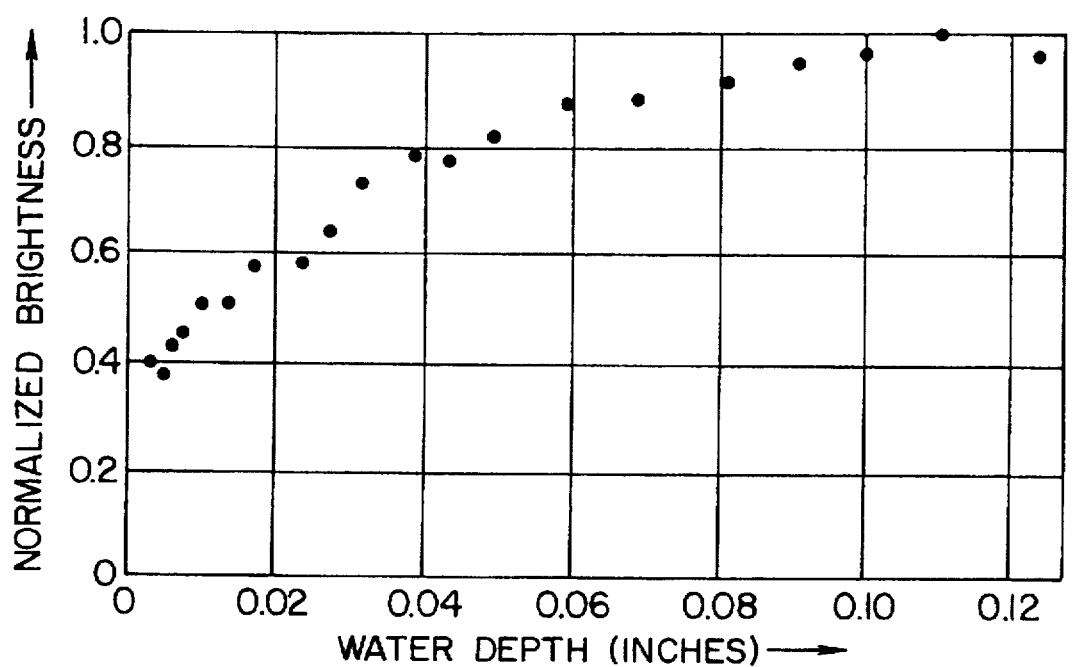
FIG. 5 illustrates the contrast sensitivity for a specific dye in liquid where water is the liquid.

In prior art tire hydroplaning devices, a fluorescent dye in water is used for liquid 28. In FIG. 5, a graph of brightness vs. water depth is provided for such a fluorescent dye in water to measure the sensitivity of the measurements. As can be seen from the graph, for this liquid the sensitivity is less than 0.01 inch.

Figure 6:
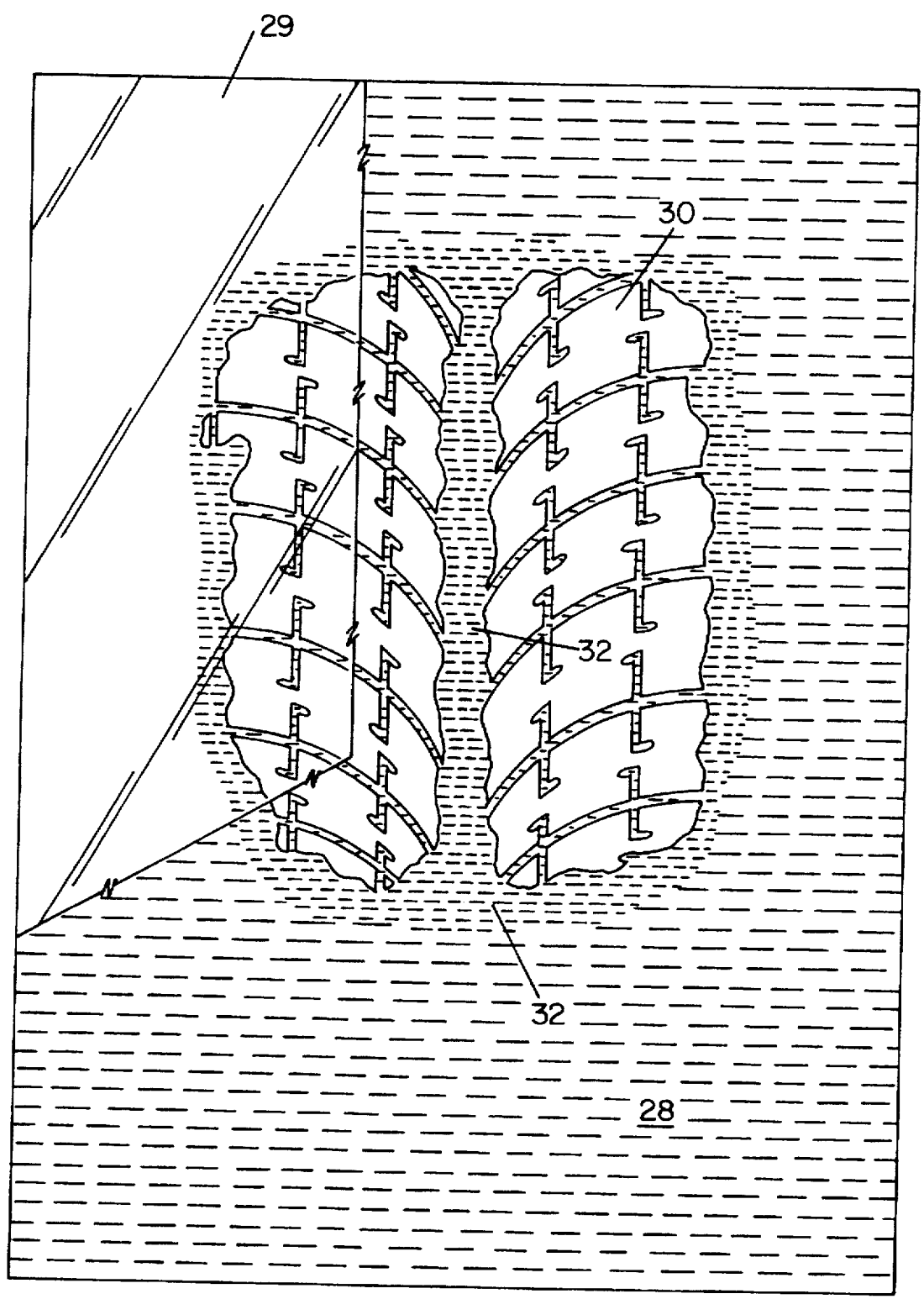
FIG. 6 illustrates a tire passing through a dye colored liquid on a glass plate.

With reference now to FIG. 6, in the method of the invention, using the illustration of tire hydroplaning testing, a tire 30 may be run over the glass plate at various speeds, and measurements of the liquid 28 under void areas 32 of the tire 30 can be used to analyze how much of the tread, and what portion of the tread is lifted by the liquid above the glass plate at each speed, and a precise measurement of the amount of separation of the tread from the glass plate can be obtained.

Those skilled in the art will recognize that a calibration device of the invention has utility beyond tire testing, such as observing the hull shape of a boat.

Although it will be possible, with practice, for talented individuals to make depth correlations by visual observation, those skilled in the art will recognize that automated results can be obtained using optical scanners and that data from optical scanners can be correlated and analyzed automatically using computers. Also, it will be apparent that data can be collected directly from observing the glass plate or by analyzing photographs or video tapes of the glass plate and the calibration device and the test object.

While specific embodiments of the invention have been illustrated and described, those skilled in the art will recognize that the invention can be variously modified and practiced. The invention is limited only by the scope of the following claims.

What is claimed is:

1. A calibration fixture for optical measurement of liquid depth comprising a base consisting of a flat contact surface around the perimeter of a first side of said base and a recessed area within said perimeter, and calibration markers of various heights within said recessed area wherein at least one calibration marker is spring loaded such that when placed on a flat surface said spring loaded calibration marker will have the same height as said contact surface around said perimeter.

2. The calibration fixture of claim 1 wherein different spring loaded calibration fixtures are loaded with different spring pressures.

3. A method for calibrating optical measurements of liquid depth in a testing apparatus comprising the steps of:

(a) providing testing apparatus with a glass plate for maintaining liquid depth at a constant level throughout test procedures using a liquid (b) providing a liquid that has color and is not opaque at the depths of interest, (c) placing on said glass plate a calibration fixture comprising a base consisting of a flat contact surface around the perimeter of a first side of said base and a recessed area within said perimeter, and calibration markers of various heights within said recessed area, (d) observing said calibration fixture through the glass plate of said test apparatus, (e) establishing a correlation between opacity of the liquid next to calibration markers and the depth of said markers.

(f) passing a test object on which measurements are to be taken through said liquid in said test apparatus, (g) observing said test object through said glass plate of said test apparatus, and (h) correlating optical properties of said liquid around said test object with optical properties of the liquid around depth markers on said calibration fixture to determine the various depths of the liquid around said test object.

4. The method of claim 3 comprising the further step of spring loading a number of calibration fixtures with different spring pressures and establishing a correlation of spring loaded calibration fixture opacity an said glass plate and the spring pressure applied.

5. The method of claim 4 comprising the further step of correlating the opacity of different lugs on a test tire with opacities established for different pressures on spring loaded fixtures.

* * * * *